Feb. 15, 1949.
P. H. CRAIG
2,462,020
METHOD AND MEANS FOR SEALING CONDUCTORS TO GLASS ENVELOPE WALLS
Filed July 3, 1945
2 Sheets-Sheet 1
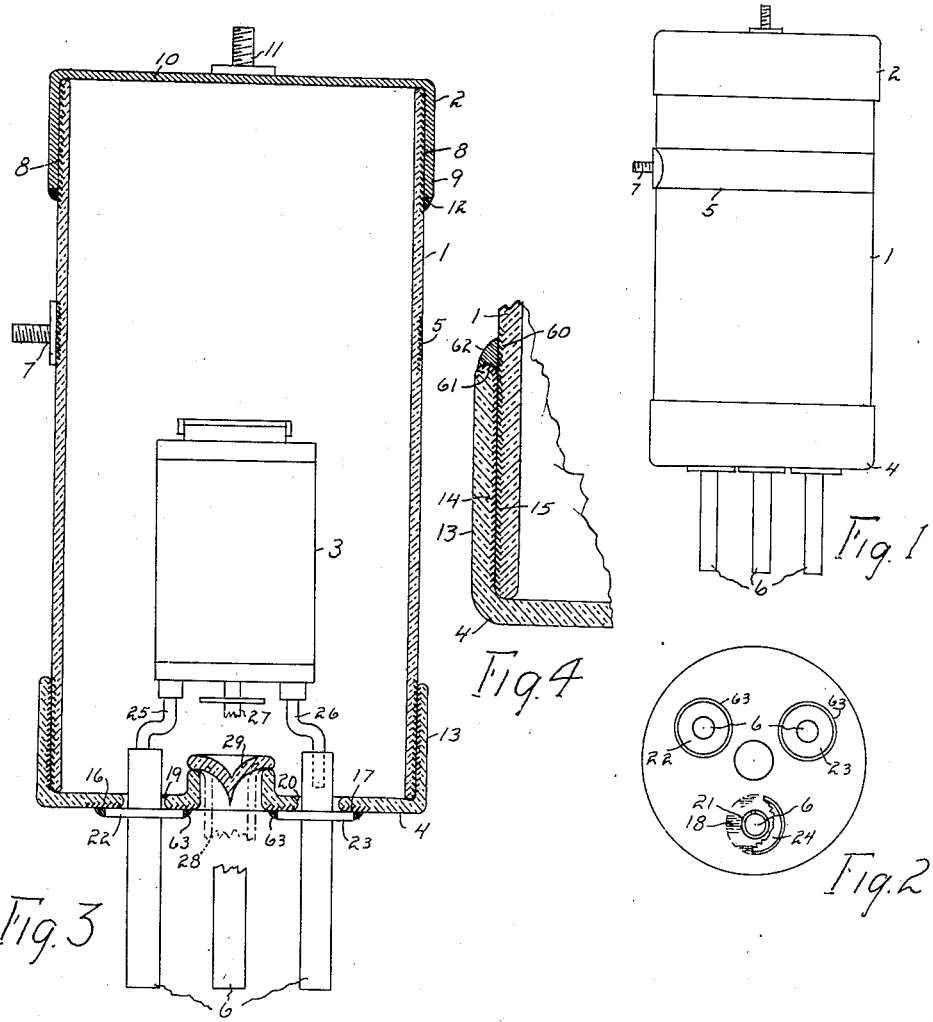
INVENTOR.
Palmer H. Craig
BY Harry R. Canfield
ATTORNEY Feb. 15, 1949.   P. H. CRAIG   2,462,020
METHOD AND MEANS FOR SEALING CONDUCTORS
TO GLASS ENVELOPE WALLS
Filed July 3, 1945   2 Sheets-Sheet 2

INVENTOR.
Palmer H. Craig
BY Harry R. Canfield
ATTORNEY

Patented Feb. 15, 1949

2,462,020

UNITED STATES PATENT OFFICE 2,462,020

METHOD AND MEANS FOR SEALING CONDUCTORS TO GLASS ENVELOPE WALLS

Palmer H. Craig, Gainesville, Fla.

Application July 3, 1945, Serial No. 604,274

4 Claims. (Cl. 250—27.5)

This invention relates to methods and means for sealingly connecting an electrical conductor to a glass or like container in electrical communication with its interior.

The invention is particularly applicable to evacuated tubes, for example lamps or electronic tubes, having thin blown glass walls, in which a conductor conducts electric current to the inside of the lamp or tube envelope; and I have therefore chosen to illustrate and describe my invention as applied to that use although as will become apparent hereinafter it has other uses.

Inasmuch as vacuum, or reduced pressure, must be maintained in a tube or lamp envelope, and the envelope is usually made of glass, a conductor passing through the glass wall of the envelope must be sealed to it and this is usually done by fusing the glass to the metal conductor; but the coefficient of expansion and contraction of the metal conductor, when ordinary metals are used, is different from that of glass, and this frequently causes the glass to crack at the fused juncture.

Resort has been had to the use of metals whose expansion coefficients are nearly the same as that of glass; and cracking of the glass can be avoided by their use; but the only known metals having such coefficients of expansion and which also will be wetted by the glass during fusion to make an air juncture possible are tungsten, molybdenum and synthetic metal alloys which are very expensive.

Cracking of the glass wall of the envelope is particularly apt to occur when it is made of hard or tempered glass as is usual for example with certain types of electronic tubes, but even when the glass envelope is made of soft glass and conductors of more ordinary and cheaper metal may be used without cracking, the fusing of the glass to the metal conductors introduces the necessity of extreme care in effecting a hermetic seal at the juncture, and entails considerable expense in the process and apparatus for commercial production.

When a conductor of ordinary metal such for example as copper, whose coefficient of expansion and contraction is greater than that of glass, extends through the glass wall of a tube envelope and the glass is fused by heat to the conductor to seal it, the metal may cool after the fused glass solidifies, and contract more than the glass and crack the glass, because it puts the glass under tension and the tensile strength of glass is low. Or if the metal were caused to cool first so that the glass would cool later, and so that the glass would adhere to the cooled metal without cracking when the tube is made, then when the metal heats up thereafter in use, it expands more than the glass and exerts a wedging action on it, again putting it under tension and cracking it. This follows from the fact that usually, as in prior practice, the conductor passes through an opening in the glass and is therefore surrounded by glass.

According to my invention, the glass of the envelope and the metal of the conductor together with any metal constituting part of the seal structure, are so disposed at the place where they are sealed one to the other, that after the sealing juncture is made the metal may readily be caused to cool later than the glass but in contracting as it cools it puts the glass under compression (instead of tension) and glass is so much stronger under compression than under tension that it does not crack. When the metal later becomes heated in use, it merely reduces the compression strains and hence does not subject the glass to tension and crack it.

Also according to my invention, the conductor, where it passes through the envelope wall, can be kept out of contact with the wall, so that upon expansion of the conductor by heat it cannot exert a wedging or rupturing action on the glass to break it.

In another aspect of my invention, metal is sealed to the glass wall of a glass envelope in such manner that in some cases, for example in some types of electronic tubes, an external conductor may be caused to communicate with the interior of the tube without passing through the wall.

It is among the objects of the invention:

To provide generally an improved method and means for effecting electrical communication between an external conductor and the interior of an evacuated tube, lamp or the like;

To provide an improved method for sealing a conductor to the wall of a glass or like envelope through which it passes;

To provide an improved means for sealingly connecting a conductor to the wall of a glass or like envelope through which the conductor passes;

To provide an improved structure comprising a glass or like envelope and an electric conductor sealingly passing through the envelope wall;

To provide a means and method in which heat is utilized to effect a sealed juncture between a metal conductor and the glass wall of an envelope and with the conductor in electrical communication with the envelope interior, and by which upon cooling of the metal at the juncture before cooling of the glass, the glass is subjected to compression strains.

Other objects will be apparent to those skilled in the art to which my invention appertains. My invention is fully disclosed in the following description taken in connection with the accompanying drawing in which:

Fig. 1 is one type of elevational view of an electronic tube embodying my invention;

Fig. 2 is a bottom plan view of the tube of Fig. 1, with a part broken away for clearness;

Fig. 3 is a longitudinal sectional view to enlarged scale of the tube of Fig. 1 with parts thereof magnified;

Fig. 4 is a fragmentary view of a part of Fig. 3 to larger scale illustrating step of process;

Figure 5:
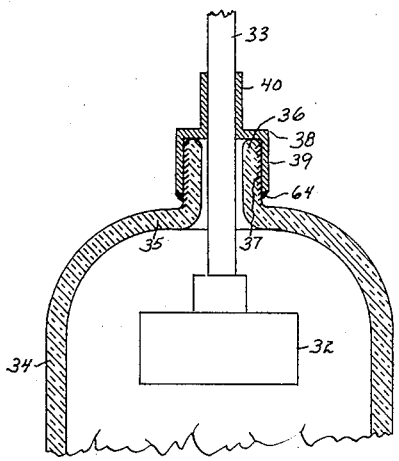

Figs. 5, 6, 7, and 8 are fragmentary views of other types of tube and illustrating modifications of the invention.

Referring to the drawing Figs. 1, 2, and 3, which illustrate a rectifier type electronic tube, I have shown generally at 1 a part of the tube envelope as made of tubular form from glass; at 2 a metal cup form element which functions both as a closure for the upper end of the tubular envelope wall 1 and as an anode electrode; at 3 a cathode electrode of the heated type; at 4 generally, a closure for the lower end of the tube, made generally from glass; at 5 a control electrode in the form of an outside band surrounding the side wall 1 of the tube; and at 6—6 plug prongs for connecting the tube to the usual socket.

To make the control electrode 5, and for sealing the junctures at the upper and lower ends of the tube, I provide on the surface of the glass wall, a metallic skin, integral with the glass, and utilize certain properties thereof; and the preferred method of making such a skin is as follows.

There are known compounds comprising among other constituents an oil vehicle containing in solution a salt or salts of the noble metals: platinum, gold, silver, etc. Such preparations have heretofore been used to ornament or decorate glassware or other ware having a glass-like surface. A coat or film of the liquid compound is painted with a brush or otherwise applied on the surface of the glass in the desired pattern and allowed to dry. The glass is then heated and this converts the metal salt into a metallic skin and it then has the color and general appearance of the metal itself. Several successive applications of the process produce a skin of corresponding greater density and thickness.

I have found that the metal of the compound is by this process incorporated in or with the glass in the nature of a skin, and for a substantial depth inwardly from the surface, the molecules of the metal mixing or merging with those of the glass, the skin therefore being molecularly intermingled glass and metal; and I have found that this mixture or skin has, generally speaking, the properties of both metal and glass and can therefore properly be defined as metallic glass, to wit: I have found that it is electrically conducting, and has very low specific ohmic resistance; and that solder will adhere firmly thereto; and I have found furthermore that two bodies of such glass each having a skin of such metallic glass may be soldered together on their metallic glass portions; and that a rigid, solid and secure junction may be made between metal parts or elements and the glass on which such a skin has been provided, by soldering them to the skin.

In the drawing this metallic glass skin has for convenience been illustrated as a distinct metal layer, and may sometimes hereinafter be referred to as a metal layer or skin, but it is to be understood that the metal is not in a layer actually superimposed on the surface of the glass as explained above, the metal being absorbed by and integrally incorporated in and molecularly intermingled with the glass.

It has heretofore been proposed to provide a layer of metal particles on glass, for example by spraying metal on the glass by various metal spraying processes, particularly after first heating the glass to or approaching the fusing temperature. Such sprayed on skins do not adhere solidly to the glass, are easily abraded and scratched off, and metal elements soldered to such layers become detached from the glass by lifting off the insecure layer from the glass.

Referring again to the drawing, to provide the control electrode 5, I form on the outer surface of the glass tube 1 a metallic skin by the above-described process, and solder thereto a metal terminal 7, by which an electric circuit may be connected to the electrode.

Upon the outer surface of the tubular glass wall 1 at its upper end, I provide a metallic skin 8. The cup form metal element 2 has a skirt 9 depending from the bottom 10 of the cup, and this skirt is telescoped over and substantially fits the outer surface of the tubular wall 1 engaging the skin 8. The inner surface of the skirt 9 is preferably solder-tinned so that after telescoping it into the position illustrated, it may be heated to thereby solder it to the skin 8 and make an integral hermetic seal therewith. The bottom 10 of the cup constitutes the anode of the rectifier tube and a terminal stud 11 may be spot-welded or otherwise attached to the anode 10 for making electrical connection therewith.

If desired, external solder 12 may be applied, joining the skirt periphery to the lower portion of the skin or layer 8 as shown in the drawing.

The closure 4 at the lower end of the tube 1 is made of glass and is generally of cup form, having an upwardly extending skirt 13 telescopingly engaging and substantially fitting the outer surface of the wall 1. As shown in Fig. 4 the inner surface of the skirt 4 is provided with a skin 14 and the outer surface of the wall 1 is provided with a like skin 15 and when the two parts are telescoped together these skins are contiguous. These skins are preferably solder-wetted before telescoping them together. Heat is applied to fuse the solder, thereby integrally uniting the two skins, and thereby making an integral glass to glass hermetical seal.

If desired, the metallized glass skin 15 on the envelope may be extended beyond the skirt 13 as at 60 in Fig. 4, and the skin 14 on the skirt may be extended over its end as at 61 and external solder may be applied as at 62.

The outer bottom surface of the cup form closure 4 has formed thereon a plurality such as three skins of metallic glass, preferably of circular pattern and spaced apart, two of which are shown in Fig. 3, at 16 and 17 and the other of which is shown at 18 in Fig. 2; these patterns of skin surrounding openings 19, 20, and 21 in the bottom of the closure 4.

The metal prongs 6—6 have metal collars or flanges 22—23—24 thereon intermediate their ends and the upper ends of the prongs extend through the openings 19—20—21 and into the envelope, when the collars or flanges lie upon the skins 16, 17, 18.

The said flanges which are preferably circular as shown in Fig. 2 are soldered to the said circular skins 16—17—18 either by feeding solder in between them or by first solder-tinning the flanges as mentioned above or by like known means. External solder may be applied at the peripheries of the flanges as at 63.

The openings 19, 20, 21 are slightly larger than the diameter of the prong portions extending therethrough.

Conductors 26—26—27 from the cathode 3 are connected to the upper ends of the prongs.

Electric conducting paths are thus provided from the prongs to the cathode for the usual purposes, passing through the bottom of the closure 4 in hermetically sealed relation thereto.

The flanges 22—23—24 may be made in one piece with their respective prongs 6, or they may be made separately and sealingly joined to the prongs where the prongs pass through them.

The tube may be evacuated, and filled with gas if desired, by a tubulation indicated in broken line at 28 and sealed off at 29 by the well known process.

It will be observed that in this rectifier tube, two general types of means are provided, respectively at the upper and lower ends of the tube, for conducting current into it, in both of which, expansion or contraction of the metal parts by heat will not crack the glass. As to the anode end, the skirt 9 at the time of soldering it to the skin 8 will be hot and when it cools and contracts, even if made of ordinary metal having a greater thermal coefficient than the glass, will contract and constrictingly grip and compress the glass of the tube 1, and the compression resisting strength of the glass particularly when in the form of a tube as illustrated, will prevent it from cracking.

Upon subsequent heating of the cup 2 in use, the skirt 9 may expand but it will merely thereupon remove the compression strain in the glass and this of course will not crack the glass.

As to the closure at the lower end of the tube, the flanges 16—17—18 upon cooling and contracting after being soldered to the glass will likewise subject the glass, at the portions thereof surrounding the openings 19—20—21, to compression, and upon subsequently expanding when heated in use, will merely remove the compression, and since the metal of the prong at its point of passing, as a conductor through the wall, is not in contact with the periphery of the openings 19—20—21, it will not crack them. The glass in those portions distant from the openings 19, 20, 21 and surrounding the peripheries of the flanges may be subjected to some tension strain when the flanges contract but such strains are distributed over so large an area as to be negligible at any point.

The skirt 13 and the wall 1 being both of glass will expand and contract uniformly without liability of cracking.

At the cathode end of the tube the openings 19—20—21 are provided in a glass wall planar portion and the conductors 6—6—6 extend therethrough; at the anode end, the opening through the glass wall is the open end of a glass tube, and the conductor has a skirt telescoped thereover. In either case the principle is the same, the conductor communicating with the interior of the envelope through an opening in it, and the opening being sealed by a metal element, integral with or sealingly connected to the conductor, and soldered upon a skin which surrounds the opening.

In the modification of Fig. 5, a rectifier type tube is shown having an anode 32 of more conventional form, to which current is conducted by a lead wire 33 passing through the glass wall of the envelope. In this form the side wall 34 of the envelope continues into an end wall 35 projecting outwardly from which is a short tubular extension 36, the inner diameter of which is at least as great as, but preferably greater than, the outside diameter of the wire 33 which extends through it. The outer wall of the tubular extension 36 has a skin or layer of metallic glass 37 formed thereon by the above described process. A metal element 38 is provided having a portion 39 which telescopes over the tubular extension 36, and its inner wall is soldered, as hereinbefore described, to the skin 37. External solder may be used as at 64. Above the tubular extension the element 38 has a tubular portion 40 which substantially fits around the wire 33 where it passes through it and is soldered to it.

The opening through the tubular extension 36 is thus sealed by the metal element 38 which is sealed upon the skin 37 at portions surrounding the openings, and sealed upon the wire 33. Here, as referred to above, the glass of the envelope, particularly that of the tubular extension 36 is subjected to compression, by the metal element portion 39, as it contracts and therefore the tendency of the glass to crack upon changes of temperature of the element 38 or the lead in wire 33 as in prior constructions is eliminated as explained hereinbefore.

Figure 6:
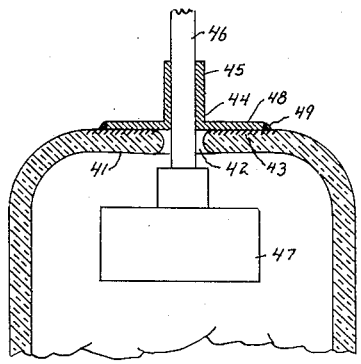

In the form of Fig. 6, the glass upper end wall 41 of the rectifier tube envelope has a perforation 42 therethrough; and a skin 43 of metallic glass is formed on the outer surface of the wall surrounding the perforation. A metal element 44 is provided, having a tubular portion 45, through which the lead in wire 46 passes and to which it is soldered, the wire 46 being connected to an anode 47. The wire 46 passes through the opening 42 with clearance. The metal element 44 has also a flange 48 which lies upon the skin 43 and the flange and skin are soldered together, as described hereinbefore on their mutually engaged surfaces. External solder 49 may be applied between the peripheral edge of the flange and the layer 43.

Figure 7:
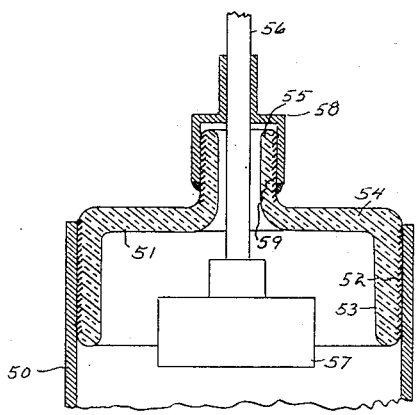

Some types of rectifier tubes, particularly those having pool cathodes, have an envelope side wall of metal; and an upper end wall of glass through which a conductor is led and sealed. Fig. 7 illustrates one way in which my invention is applicable to such tubes.

The tubular metal wall is shown at 50. The upper end wall 51 is of glass, and generally of cup-form. A layer 52 is formed on the outer surface of the skirt 53 of the cup, and the skirt is telescoped into the end of the metal wall, and the skin 52 is soldered to the metal wall. The bottom 54 of the glass cup has a short tube 55 extending therefrom, and through which the wire 56 to the anode 57 passes. A metal element 58 is sealed to the wire 56 and to a skin 59 on the short tube 55 similarly to the arrangement in Fig. 5 described above. The strains produced in the glass by thermal contraction and expansion of the metal of the wall 50 or metal element 58 are, as referred to above, compression strains which the glass resists without cracking.

In Fig. 7 also, the metal wall is in electrical connection with a cathode of the pool type not shown, so that the metal wall 50 is a conductor communicating with the interior of the envelope and the lower open end of the glass element 51 is an opening which is sealed to the conductor 50 upon a skin 52 surrounding the opening within the scope of my invention.

In some types of evacuated tube envelopes, the wire passing through and sealed to the glass envelope wall is of small diameter, and it is not necessary or desirable for the metal element to have a tubular portion extending along the wire to support it as in some of the preceeding forms.

Figure 8:
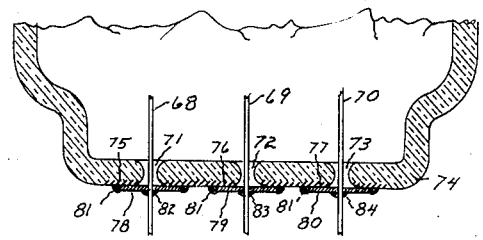

In Fig. 8 this has been shown for the envelope of a three element electronic tube. Three wires 68—69—70 pass freely through holes 71—72—73 respectively in the glass wall of the envelope, leading interiorly to the elements of the electronic tube structure and exteriorly to a three prong plug, which parts have been omitted to simplify the drawing. The outer surface of the glass wall 74, on the surface portion surrounding each hole, has metallic layers or skins formed thereon as shown at 75—76—77 respectively.

Simple metal washers or discs 78—79—80, are provided, perforated at their centers, and the wires pass through the discs and through the holes. The discs are soldered to the skins. External solder may be provided at 81 at the peripheries of the discs. The wires substantially fit the perforations in the discs, and solder at 82—83—84 seals the wires to the discs.

The holes 71—72—73 are thus hermetically sealed and the wires 68—69—70 are sealed to the wall, and the glass is subjected to only compressive strains as referred to above. The parts of Fig. 8 as well as parts of the other figures have been referred to above.

In the foregoing where reference is made to solder, it will be understood that a non-porous solder will be preferable and to this end I prefer to use as the solder, tin, or a solder having a large proportion of tin.

My invention is not limited to the exact details illustrated and described herein. Changes and modifications may be made within the spirit of my invention and my invention comprehends all such changes and modifications which come within the scope of the appended claims.

I claim:

1. An evacuated envelope comprising a wall portion of thin blown glass having an opening therethrough; a portion of the glass wall surrounding the opening comprising metal and wall-glass molecularly intermingled for a substantial depth inwardly from the outer surface of the wall portion and the said outer surface having the property of being adhesive to solder; a metal element having an opening therethrough surrounded by metal of the element; an electrical conductor extending through both said openings and into the envelope and sealingly soldered to the metal element at its opening; and the metal element having a portion circumscribing the wall opening and engaging the surface of the molecularly intermingled metal and glass and sealingly soldered thereto at said circumscribing portion.

2. An evacuated envelope comprising a wall portion of thin blown glass having an opening therethrough, an electrical conductor smaller than the opening and passing therethrough and communicating with an electrode within the envelope to energize it, a portion of the glass wall surrounding the opening comprising metal and wall-glass molecularly intermingled for a substantial depth inwardly from the outer surface of the wall portion and the said outer surface having the property of being adhesive to solder, a rigid metallic means comprising a sleeve portion telescoped over a substantial length of the conductor and rigidly and sealingly joined to the conductor and comprising a flange portion integral with the sleeve portion and covering the opening and overlapping and sealingly rigidly soldered to the surface of the molecularly intermingled metal and glass.

3. An evacuated envelope comprising a wall portion of thin blown glass having an opening therethrough and through a tubular extension surrounding the opening, an electrical conductor smaller than the opening and passing therethrough and communicating with an electrode within the envelope to energize it a portion of the outer glass wall of the tubular extension comprising metal and wall-glass molecularly intermingled for a substantial depth inwardly from the outer surface of the wall and the said outer surface having the property of being adhesive to solder, rigid metallic means comprising a sleeve portion telescoped over a substantial length of the conductor and sealingly rigidly joined to the conductor and comprising a cup form portion integral with the sleeve portion and disposed with the cup bottom covering the end of the tubular extension and telescoped thereover, and sealingly rigidly soldered to the surface of the molecularly intermingled metal and glass.

4. An evacuated envelope comprising a wall portion of thin blown glass having an opening therethrough; a portion of the glass wall surrounding the opening comprising metal and wall glass molecularly intermingled for a substantial depth inwardly from the outer surface of the wall portion and the said outer surface having the property of being adhesive to solder; an electrical conductor extending through the opening and into the envelope; a metal element integrally connected with and surrounding the conductor and having a portion circumscribing the wall opening and engaging the surface of the molecularly intermingled metal and glass and rigidly sealingly soldered thereto at said circumscribing portion.

PALMER H. CRAIG.

REFERENCES CITED

The following references are of record in the file of this patent:

UNITED STATES PATENTS

| Number | Name | Date |
|---|---|---|
| 1,639,575 | Robinson | Aug. 16, 1927 |
| 1,644,744 | Pingen | Oct. 11, 1927 |
| 1,884,665 | Greiner | Oct. 25, 1932 |
| 2,097,073 | Long | Oct. 26, 1937 |
| 2,098,080 | Wright | Nov. 2, 1937 |
| 2,341,920 | Hull | Feb. 15, 1944 |